May 10, 1966 F. E. WINNEN ETAL 3,250,542
HYDRAULIC CHUCKS AND ARBORS
Filed May 4, 1964 2 Sheets-Sheet 1
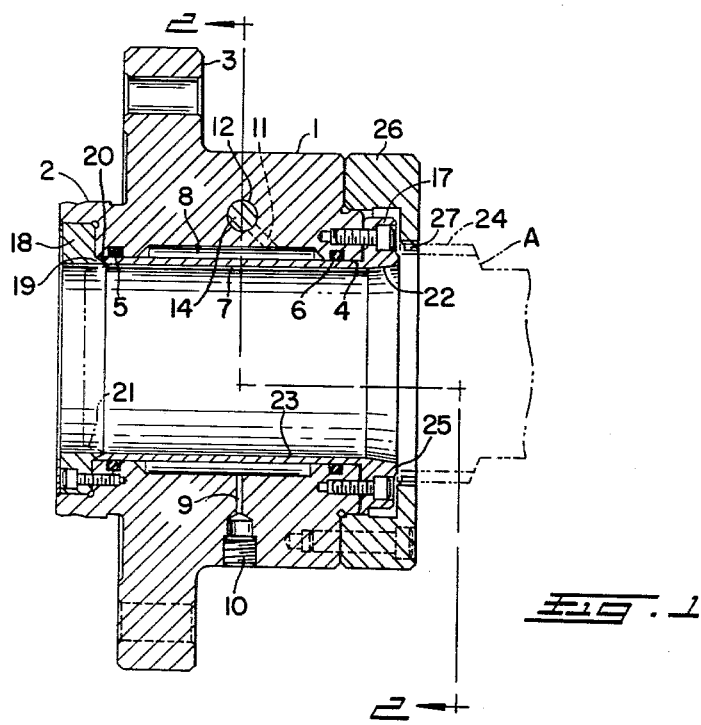
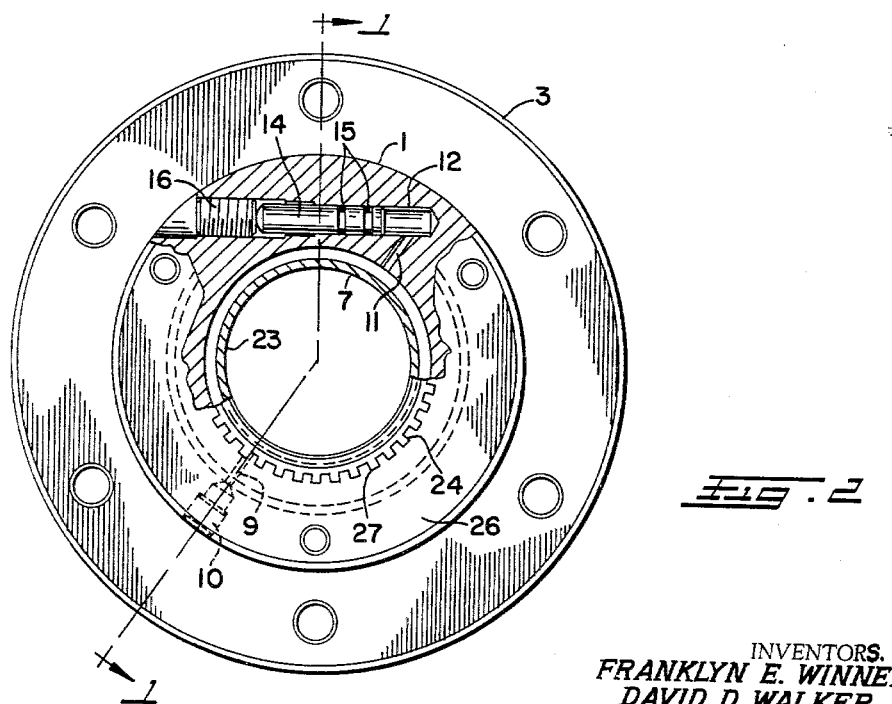
INVENTORS.
FRANKLYN E. WINNEN
DAVID D. WALKER
BY
Oberlin, Maky & Donnelly
ATTORNEYS INVENTORS.
FRANKLYN E. WINNEN
DAVID D. WALKER
BY Oberlin, Maky & Donnelly
ATTORNEYS

United States Patent Office 3,250,542
Patented May 10, 1966

3,250,542
HYDRAULIC CHUCKS AND ARBORS
Franklyn E. Winnen, Cleveland, and David D. Walker, Chagrin Falls, Ohio, assignors to Erickson Tool Company, Solon, Ohio, a corporation of Ohio
Filed May 4, 1964, Ser. No. 364,367
9 Claims. (Cl. 279—4)

The present invention relates generally as indicated to hydraulic chucks and arbors and, more particularly, to a chuck or holding device of the hydrostatic type in which pressure applied on oil or grease confined in an annular chamber in the device is effective to elastically deform a relatively thin wall of the chamber into gripping engagement with a workpiece, tool, or the like therewithin or therearound.

In known devices of this type, the outer wall of the annular chamber is constituted by a relatively thin metal sleeve which has its ends welded around the body of the holding device. Said sleeve is thus sealed and secured at its ends to the body to preclude leakage of the hydrostatic fluid and the portion of the sleeve between its ends is radially expanded upon exertion of pressure on the hydrostatic fluid. Welded joints of this type suffer a disadvantage in that the welding operation produces expansion due to the heat of welding, and moreover, the subsequent shrinkage which occurs is apt to weaken the joints at the zones of welding. The welding operation also causes deformation of the parts of the holding device with resultant strains therein when the assembly cools to ambient temperature.

It is an object of this invention to provide a hydrostatic chuck or holding device of the character in which the deformable sleeve is securely mounted in the body of the holding device without welding, and in such manner that packing rings of rubber-like material may be employed to preclude leakage of the hydrostatic fluid through the joints between the telescopically interfitting sleeve and body.

It is another object of this invention to provide a hydrostatic chuck or holding device in which the aforesaid deformable sleeve is so fashioned and mounted that there is no perceptible deformation of the sleeve in the areas of the aforesaid packing rings whereby no leakage of the hydrostatic fluid can occur in use of the holding device, and that the deformation of the sleeve occurs uniformly along a major portion of the length thereof to provide for firm and stable gripping of a work-piece, tool, or the like.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawing:

FIG. 1 is a longitudinal cross-section view of one form of chuck or holding device taken susbtantially along the line 1—1, FIG. 2;

FIG. 2 is a transverse cross-section view taken substantially along the line 2—2, FIG. 1;

Figure 3:
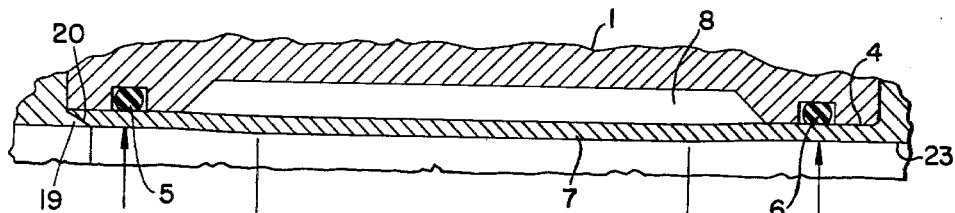
FIG. 3 is a much enlarged fragmentary radial cross-section view showing the manner in which the gripping sleeve deforms upon application of pressure on the hydrostatic fluid confined in the annular chamber of the present chuck or holding device.

Referring now more particularly to the drawing, the referring numeral 1 denotes the body of the chuck which is provided with a pilot 2 and a mounting flange 3 by which the same may be secured on the spindle (not shown) of a metal-working machine or machine tool. The body 1 has a bore 4 therethrough which is internally grooved adjacent its ends to receive therein O-rings 5 and 6 or like packing rings of rubber-like material. Between said packing rings 5 and 6, the body 1 is undercut to form with the sleeve 7 an annular chamber 8 which is adapted to be filled with oil or grease or equivalent hydrostatic fluid as through the passage 9 leading to said chamber 8.

When the chamber 8 has been filled with hydrostatic fluid, the passage 9 may be closed as by means of the threaded plug 10. For the purpose of applying hydrostatic pressure on such fluid, the body 1 is formed with another passage 11 leading from chamber 8 to the transverse passage 12, passage 12 having a plunger 14 with O-rings 15 or the like axially slidable therein. The end of the transverse passage 12 is internally threaded to receive a socket head screw 16 which, when turned, bears on the axially outer end of the plunger 14, thus to apply compressive force on the hydrostatic fluid to effect deformation of the sleeve 7 in a manner now to be described in detail.

The sleeve 7 aforesaid in the form of the invention illustrated in FIGS. 1, 2, and 3 has an integral flange 17 which is bolted to the end of the body 1, the sleeve 7 extending through substantially the entire length of the bore 4 of the body 1 so that its end portions are in sealed engagement with the O-rings 5 and 6. Bolted in a counterbore in the other end of the body 1 is a collar member 18 which has a tapered or frusto-conical lip 19, preferably of 60° included angle, which matches the correspondingly internally beveled or countersunk end 20 of the sleeve closely axially adjacent the O-ring 5. To facilitate insertion of the article A in sleeve 7 the entrance may be slightly tapered as at 22.

In the present case, by way of example only, the workpiece, tool holder, or other article A, has an elongated shaft portion 21 which is a close fit in the bore 23 of the sleeve 7 and which is of substantial length to extend throughout substantially the entire length of the sleeve 7. Adjacent the shaft portion 21 is a gear portion 24 having a shoulder 25 adapted to abut the end of the sleeve 7. For locking the article A against turning with respect to the chuck there is mounted on the body 1 a collar member 26 having internal teeth 27 matching those of the article A to be gripped.

To firmly grip said article A after it has been inserted as shown in FIG. 1, all that is necessary to do is to turn the socket head screw 16 to cause the plunger 14 to advance toward the right as viewed in FIG. 2, whereupon, pressure is applied on the hydrostatic fluid. In this case, the pressure built up in the hydrostatic fluid causes radial inward deformation of the wall of the sleeve 7 into firm and accurate gripping engagement around a substantial and major portion of the length of the shaft portion 21 of article A. To prevent the possibility of excessive pressure being built up in the hydrostatic fluid, it is to be noted that the socket head screw 16 has limited travel in the transverse passage 12.

By way of example, it has been found that in the case of a steel sleeve 7 of .070" wall thickness and having a bore 23 therethrough of 2.1255″ diameter, for gripping the shaft portion 21 of an article A of 2.125″ diameter, the application of a pressure of 3,000 p.s.i. on the hydrostatic fluid results in no measurable contraction of the sleeve 7 within the O-rings 5 and 6, which in this example were spaced about 2⅝″. However, at this pressure and without an article A within the sleeve 7, said sleeve was deformed to uniform diameter of 2.1215″ for about ⅔ of its length midway between the O-rings 5 and 6. This is most clearly shown in FIG. 3 in which the diameter of sleeve 7 at B and C remained at 2.1255″ and decreased to 2.1215″ throughout the length D when the pressure of the fluid in chamber 8 was 3,000 p.s.i.

Accordingly, when the sleeve 7 is deformed as aforesaid, even without an article A therewithin, there is no deformation thereof within the O-rings 5 and 6 and thus no leakage of the hydrostatic fluid can occur between the body 1 and sleeve 7 joints. Of course, when the shaft portion 21 of 2.125″ diameter is inserted into the sleeve 7, it will be firmly, uniformly, and stably gripped by the sleeve 7 throughout the relatively great axial length D even when the pressure on the hydrostatic fluid is less than the 3,000 p.s.i. indicated in the aforesaid example.

When it is desired to release the article A, the socket head screw 16 is turned to move it toward the left as viewed in FIG. 2, whereupon the sleeve 7 springs back to the original inside diameter of bore 4 and the hydrostatic fluid expands to move the plunger 14 toward the left.

Figure 4:
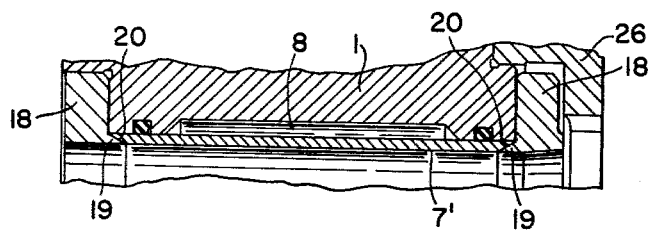
FIG. 4 is a fragmentary radial cross-section view showing a modified form of sleeve mounting.

Referring to FIG. 4, both ends of sleeve 7' are internally beveled as at 20 to match the tapered lips 19 of the separate collar members 18 which may be identical with the collar member 18 shown in FIGS. 1 and 3. The members 18 are preferably harder than sleeve 7' to provide strong, non-deformable lips 19 and to resist wear and deformation due to insertion and withdrawal of workpieces.

Figure 5:
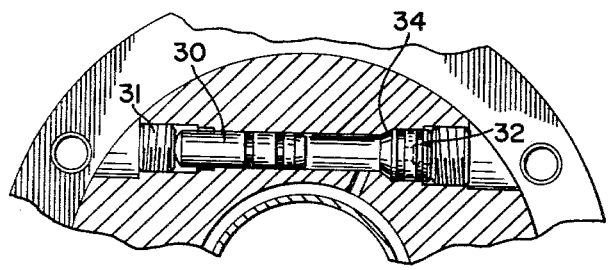
FIG. 5 is a transverse cross-section view showing a modified form of plunger for applying pressure on the hydrostatic fluid.

In FIG. 5, there is shown another arrangement of plunger mechanism to aid in filling of the chuck with hydrostatic fluid. Thus, with plunger 30 and screw 31 in fully retracted position, and with screw 32 removed, the chuck may be filled through passage 9 (see FIG. 1) and excess fluid beyond seat 34 is displaced through the filling passage 9 (pipe plug 10 loosely inserted to permit leakage) as the screw 32 is brought into engagement with seat 34. Thereafter pipe plug 10 is fully tightened to seal the fluid in the chuck.

Figure 6:
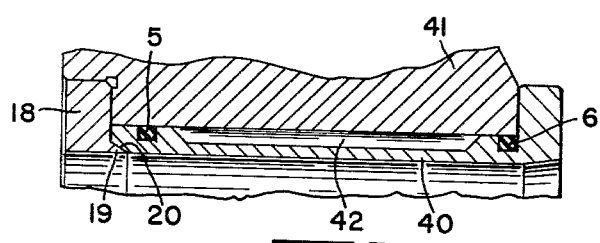
FIG. 6 is a fragmentary radial cross-section view showing another form of gripping sleeve.

FIG. 6 is similar to FIG. 1 except that the O-rings 5 and 6 are disposed in external grooves formed in the sleeve 40 itself thus to eliminate undercutting operations in the body 41. Likewise, the grease or oil chamber 42 is defined by a long peripheral groove in the sleeve 40. The collar member 18 having the lip 19 engages in the tapered mouth 20 in the sleeve 40 to support the latter although it is strengthened due to radial thickening adjacent the packing ring grooves.

Figure 7:
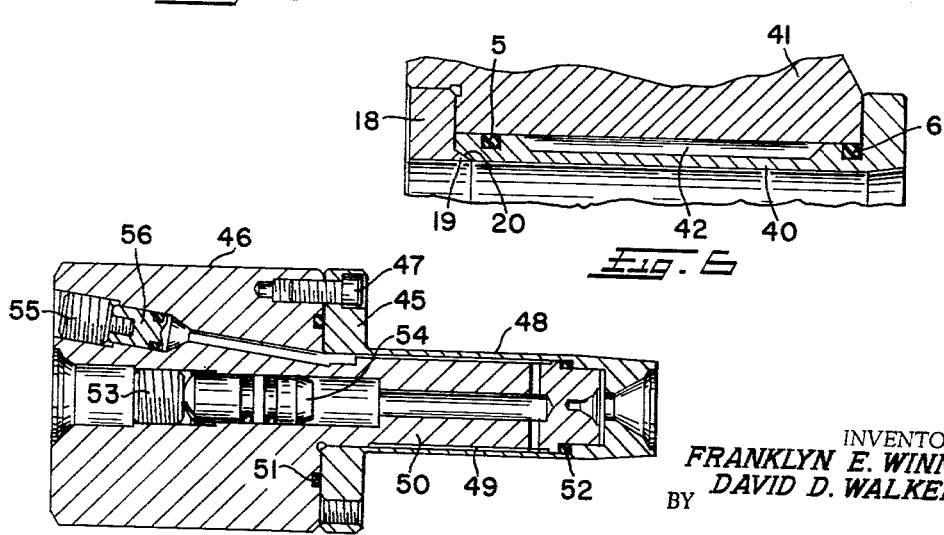
FIG. 7 is a diametral cross-section view of an arbor or mandrel.

While in FIGS. 1 to 6, the pressure on the grease or oil radially contracts the thin-walled sleeve it is to be understood that the sleeves may be arranged reversely for radial expansion by such fluid pressure. Such an expansible arbor or mandrel is illustrated in FIG. 7 wherein a flanged sleeve 45 is secured to the body 46 as by screws 47, the long, thin-walled portion 48 of said sleeve surrounding the groove 49 of the reduced extension 50 of said body 46. Leakage of fluid is prevented as by O-rings 51 and 52 which are sealed between the body 46 and sleeve 45 adjacent radially thickened rigid zones of the latter so that substantially no expansion occurs thereat to cause leakage. In FIG. 7 pressure is applied on the grease or oil by turning the screw 53 which bears on plunger 54. The plug 55 and plunger 56 is for venting when filling the arbor assembly.

Other modes of applying the principle of the invention may be employed, change being made as regards the details described, provided the features stated in any of the following claims, or the equivalent of such, be employed.

We therefore particularly point out and distinctly claim as our invention:

1. A hydrostatic chuck comprising a chuck body and a metal workpiece-gripping sleeve telescopically interfitting one within the other and defining therebetween a chamber of substantial axial length adapted to be filled with a non-compressible fluid; packing rings radially squeezed between said body and sleeve adjacent the ends of said chamber effective to seal the body-sleeve joints thereat; said body having a passage leading to said chamber; said sleeve between said packing rings being relatively thin and of uniform radial wall thickness so as to be radially deformed to grip a workpiece upon supplying fluid pressure to said chamber; and a collar member secured to said body in radially and axially overlapped relation with one end of said sleeve axially adjacent the corresponding packing ring for maintaining said one end in engagement with said chuck body thus to preclude radial deformation of said sleeve thereat.

2. The chuck of claim 1 further comprising a plunger in said passage; means for moving said plunger in said passage to build up pressure in the fluid filling said passage and chamber tending to enlarge radially the latter; a second passage leading to said chamber and having a plug therein which is adapted to be removed for filling said chamber and first-mentioned passage with fluid; and a second plug in said first-mentioned passage which is adapted to be removed to facilitate filling of said chamber and first-mentioned passage through said second passage.

3. The chuck of claim 1 wherein said sleeve at its other end axially adjacent the other packing ring has an integral radially extending flange secured to said body thus to preclude radial deformation of said sleeve thereat.

4. The chuck of claim 1 wherein said sleeve has an internally beveled end portion axially adjacent the corresponding packing ring; and said collar member has an externally beveled lip in mating engagement within the internally beveled end of said sleeve thus to preclude radial deformation of said sleeve thereat.

5. The chuck of claim 1 wherein each end of said sleeve is internally beveled adjacent the corresponding packing rings; and two of said collar members are secured to said body adjacent the ends of said sleeve, each collar member having an externally beveled lip in engagement with the adjacent internally beveled end of said sleeve thus to preclude deformation of said sleeve thereat.

6. A hydrostatic chuck comprising a chuck body; a metal workpiece-gripping sleeve telescopically interfitting inside said chuck body and defining with the latter a chamber of substantial axial length adapted to be filled with a non-compressible fluid; packing rings radially squeezed between said body and sleeve effective to seal the body-sleeve joints adjacent the ends of said chamber; said body having a passage leading to said chamber; a plunger movable in said passage to build up pressure in the fluid filling said passage and chamber tending to enlarge radially the latter, said sleeve between said packing rings being relatively thin and of uniform radial wall thickness so as to be radially contracted to grip a workpiece therewithin upon movement of said plunger; and a collar member secured to said body in radially and axially overlapped relation with one end of said sleeve axially adjacent the corresponding packing ring for maintaining said one end in engagement with said body thus to preclude radial deformation of said sleeve thereat.

7. The chuck of claim 6 wherein said sleeve at its other end axially adjacent the other packing ring has an integral radially extending flange secured to said body thus to preclude radial deformation of said sleeve thereat.

8. The chuck of claim 6 wherein said sleeve has an internally beveled end portion axially adjacent the corresponding packing ring; and said collar member has an externally beveled lip in mating engagement within the internally beveled end of said sleeve thus to preclude radial deformation of said sleeve thereat.

9. The chuck of claim 6 wherein both ends of said sleeve are internally beveled adjacent the corresponding packing rings, and there is a collar member secured to said body adjacent both ends of said sleeve, each collar member having an externally beveled lip in engagement with the adjacent internally beveled end of said sleeve thus to preclude deformation of said sleeve thereat.

References Cited by the Examiner

UNITED STATES PATENTS

| | | | |
|---|---|---|---|
| 1,668,790 | 5/1928 | Teetor | 279—4 |
| 2,797,604 | 7/1957 | Atherholt | 279—4 |
| 3,097,808 | 7/1963 | Williams. | |
| 3,130,978 | 4/1964 | Van Roojen | 279—4 |
| 3,133,740 | 5/1964 | Drantz | 279—4 |

LESTER M. SWINGLE, *Primary Examiner.*

ROBERT C. RIORDON, *Examiner.*

H. V. STAHLHUTH, *Assistant Examiner.*